United States Patent … US 6,563,952 B1
Srivastava et al. … Date of Patent: May 13, 2003

(54) METHOD AND APPARATUS FOR CLASSIFICATION OF HIGH DIMENSIONAL DATA

(75) Inventors: Anurag Srivastava, Foster City, CA (US); G. D. Ramkumar, Mountain View, CA (US); Vineet Singh, Cupertino, CA (US); Sanjay Ranka, Gainesville, FL (US)

(73) Assignee: Hitachi America, Ltd., Tarrytown, NY (US)

(*) Notice: Subject to any disclaimer, the term of this patent is extended or adjusted under 35 U.S.C. 154(b) by 0 days.

(21) Appl. No.: 09/420,252

(22) Filed: Oct. 18, 1999

(51) Int. Cl.⁷ .................................................. G06K 9/62
(52) U.S. Cl. ......................................... 382/225; 382/226
(58) Field of Search ................................. 382/224, 225, 382/226, 227, 228

(56) References Cited

U.S. PATENT DOCUMENTS

| | | | | |
|---|---|---|---|---|
| 5,142,593 A | * | 8/1992 | Kasano | 382/170 |
| 5,325,445 A | * | 6/1994 | Herbert | 382/225 |
| 6,052,483 A | * | 4/2000 | Baird et al. | 382/190 |
| 6,229,918 B1 | * | 5/2001 | Toyama | 382/173 |
| 6,307,965 B1 | * | 10/2001 | Aggarwal et al. | 382/225 |

OTHER PUBLICATIONS

Kim et al. "Hierarchical Classification in High Dimensional, Numerous Class Cases." 10th Annual Int. Geoscience and Remote Sensing Symposium, May 1990, pp.2359–2362.*
Benediktsson et al. "Classification of Very High Dimensional Data Using Neural Networks." 10th Annual Int. Geoscience and Remote Sensing Symposium, May 1990, pp. 1269–1272.*
Assa et al. "Displaying Data in Multidimensional Relevance Space with 2D Visualization Maps." Proc. Visualization '97, Oct. 1997, pp. 127–134.*
Tu et al. "A Fast Two–Stage Classification Method for High–Dimensional Remote Sensing Data." IEEE Trans. on Geoscience and Remote Sensing, vol. 36, No. 1, Jan. 1998, pp. 182–191.*
Jimenez et al. "Supervised Classification in High–Dimensional Space: Geometrical, Statistical, and Asymptotical Properties of Multivariate Data." IEEE Trans. on Systems, Mand, and Cybernetics–Part C: Applications and Reviews, vol. 28, No. 1, Feb. 1998, pp. 39.*
Agrawal et al. "Automatic Subspace Clustering of High Dimensional Data for Data Mining Applications." Proc. of 1998 ACM SIGMOD Int. Conf. on Management of Data, 1998, pp. 94–105.*

* cited by examiner

*Primary Examiner*—Jon Chang
(74) *Attorney, Agent, or Firm*—Dorsey & Whitney LLP

(57) ABSTRACT

The present invention is an apparatus and method for classifying high-dimensional sparse datasets. A raw data training set is flattened by converting it from categorical representation to a boolean representation. The flattened data is then used to build a class model on which new data not in the training set may be classified. In one embodiment, the class model takes the form of a decision tree, and large itemsets and cluster information are used as attributes for classification. In another embodiment, the class model is based on the nearest neighbors of the data to be classified. An advantage of the invention is that, by flattening the data, classification accuracy is increased by eliminating artificial ordering induced on the attributes. Another advantage is that the use of large itemsets and clustering increases classification accuracy.

15 Claims, 4 Drawing Sheets

|  | Attribute 1 | Attribute 2 | Attribute 3 | Attribute 4 |
|---|---|---|---|---|
| Entry 1: | A | F | E | D |
| Entry 2: | B | C | G | H |
| Entry 3: | G | E | C | A |
| Entry 4: | B | C | H | F |

Raw Data

FIG. 3

|  | A | B | C | D | E | F | G | H |
|---|---|---|---|---|---|---|---|---|
| Entry 1: | 1 | 0 | 0 | 1 | 1 | 1 | 0 | 0 |
| Entry 2: | 0 | 1 | 1 | 0 | 0 | 0 | 1 | 1 |
| Entry 3: | 1 | 0 | 1 | 0 | 1 | 0 | 1 | 0 |
| Entry 4: | 0 | 1 | 1 | 0 | 0 | 1 | 0 | 1 |

Flattened Data

FIG. 4

| Entry No. | Age | Zip Code | Class |
|---|---|---|---|
| 1 | 30 | 12033 | C1 |
| 2 | 25 | 12033 | C1 |
| 3 | 21 | 23409 | C2 |
| 4 | 43 | 12033 | C1 |
| 5 | 18 | 23409 | C2 |
| 6 | 33 | 23409 | C1 |
| 7 | 29 | 23409 | C1 |
| 8 | 55 | 12033 | C2 |
| 9 | 48 | 12033 | C1 |

Sample Training Set

Corresponding Decision Tree

METHOD AND APPARATUS FOR CLASSIFICATION OF HIGH DIMENSIONAL DATA

FIELD

The present invention relates to computer software for classifying data. In particular, the invention uses flattening and addition of attributes to perform classification of sparse high dimensional data to more accurately predict a data class based on data attributes.

BACKGROUND

Classification is the process of assigning a data object, based on the data object's attributes, to a specific class from a predetermined set. Classification is a common problem studied in the field of statistics and machine learning. Some well-known classification methods are decision trees, statistical methods, rule induction, genetic algorithms, and neural networks.

A classification problem has an input dataset called the training set that includes a number of entries each having a number of attributes (or dimensions). A training set with n possible attributes is said to be n-dimensional. The objective is to use the training set to build a model of the class label based on the attributes, such that the model can be used to classify other data not from the training set. The model often takes the form of a decision tree, which is known in the art.

An example of a typical classification problem is that of determining a driver's risk for purposes of calculating the cost of automobile insurance. A single driver (or entry) has many associated attributes (or dimensions), such as age, gender, marital status, home address, make of car, model of car, type of car, etc. Using these attributes, an insurance company determines what degree of risk the driver imposes to the insurance company. The degree of risk is the resultant class to which the driver belongs.

Another example of a classification problem is that of classifying patients' diagnostic related groups (DRGs) in a hospital. That is, determining a hospital patient's final DRG based on the services performed on the patient. If each service that could be performed on the patient in the hospital is considered an attribute, the number of attributes (dimensions) is large but most attributes have a "not present" value for any particular patient because not all possible services are performed on every patient. Such an example results in a high-dimensional, sparse dataset.

A problem exists in that artificial ordering induced on the attributes lowers classification accuracy. That is, if two patients each have the same six services performed, but they are recorded in different orders in their respective files, a classification model would treat the two patients as two different cases, and the two patients may be assigned different DRGs.

Another problem that exists in classification pertaining to high-dimensional sparse datasets is that the complexity required to build a decision tree is high. There are often hundreds, even thousands or more, possible attributes for each entry. Thus, there are hundreds, or thousands, of possible attributes on which to base each node's splitting criterion in the decision tree. The large number of attributes directly contributes to a high degree of complexity required to build a decision tree based on each training set.

A goal of the invention is to provide a classification system that overcomes the identified problems.

SUMMARY

In one embodiment, the present invention provides a method and apparatus for classifying high-dimensional data. The invention performs classification by storing the data in a computer memory, flattening the data into a boolean representation, and building a classification model based on the flattened data. The classification model can be a decision tree or other decision structure. In one aspect of the invention, large itemsets are used as additional attributes on which to base the decision structure. In another aspect of the invention, clustering is performed to provide additional attributes on which to base the decision structure.

In another embodiment, the invention provides a method and apparatus for classifying high-dimensional data using nearest neighbor techniques. The data is stored in a computer memory, flattened into a boolean representation, and classified based on the m nearest neighbors of an entry.

An advantage of the invention is that flattening the data removes any artificial ordering introduced into the data as a result of non-uniform recording procedures, thus yielding more accurate results.

Another advantage of the present invention is that the use of additional attributes based on large itemsets and clustering improves the accuracy of the resulting decision tree on which classification is based. This is achieved by determining which itemsets are large itemsets, and then using large itemsets as additional attributes on which a tree node's splitting criterion might be based. Clustering may also be used to increase accuracy in building a decision structure.

BRIEF DESCRIPTION OF THE DRAWINGS

Additional advantages of the invention will become apparent upon reading the following detailed description and upon reference to the drawings, in which:

FIG. 3 depicts a first sample set of raw data;

FIG. 4 depicts the raw data of FIG. 3 after it has been flattened according to the invention;

DETAILED DESCRIPTION

Exemplary embodiments are described with reference to specific configurations. Those skilled in the art will appreciate that various changes and modifications can be made while remaining within the scope of the claims.

Figure 1:
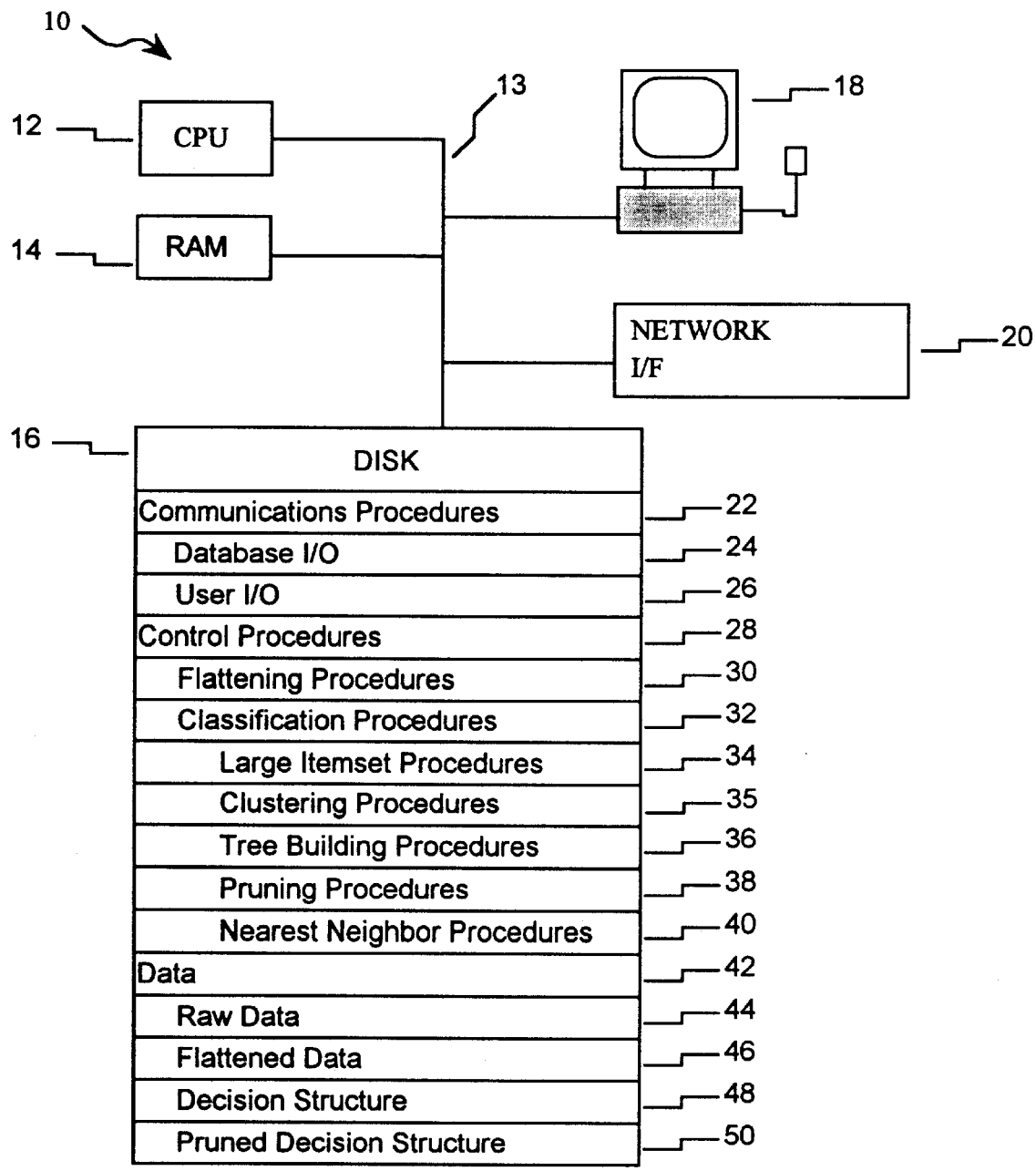
FIG. 1 depicts a computer system according to an embodiment of the invention.

An exemplary embodiment of the invention is described with reference to FIGS. 1–6. FIG. 1 depicts a computer system 10 according to an embodiment of the invention. The computer system includes a processor (CPU) 12 coupled to a bus 13. A random access memory 14 and a hard disk memory 16 are also coupled to the bus 13 and are accessible by the processor. The hard disk 16 is configured to store programs and data necessary for the invention, as described below. An optional user interface 18 is provided for input of raw data. In one embodiment, the input/output devices include a keyboard, mouse, and monitor. An optional network interface 20 is also provided. It should be appreciated that raw data may be entered in various different ways, for example via the user interface 18 or the network interface 20.

The hard disk 16 is configured to store the program and data in the computer system 10. The memory, including the RAM and the hard disk, is divided into three primary components: communications procedures 22, control procedures 28, and data 42. The communications procedures include routines 24 and 26 for receiving raw data into the memory. The control procedures include routines 30–40 that perform the invention's classification functions. The data portion of the memory stores the raw data 44, the flattened data 46, the decision structure 48, and the pruned decision structure 50. These routines are described in greater detail below.

Figure 2:
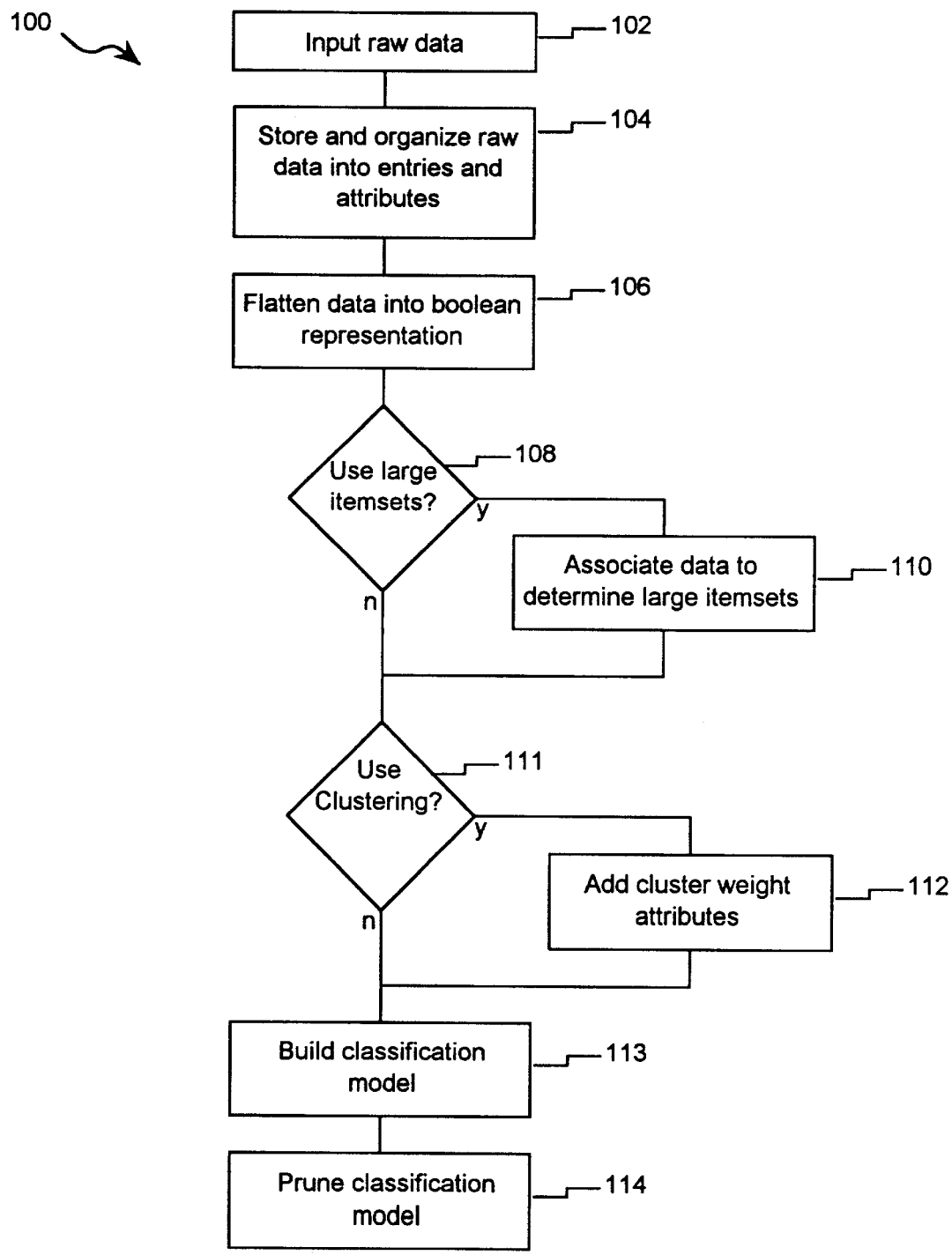
FIG. 2 depicts a flow chart for classifying data.

Operation of the invention is described with reference to the FIG. 2 flowchart. In step 102, the communications procedures 22 accept raw data as input. The raw data includes entries and a number of attributes for each entry. The attributes are typically categorical attributes, although they can be continuous attributes as well. An example of raw data is shown in FIG. 3. The raw data may or may not be ordered. That is, the attributes of each entry are not necessarily in any sort of ascending or descending order. Often, categorical attribute data is of a nature that is not suited to being sorted in an ascending or descending order. Also, for purposes of classification, the order of the attributes is often irrelevant. Data is said to be of the no dimension where n is the total number of different possible attributes of a data entry. In step 104, the data is organized by entry and attributes.

After the raw data is received, in step 106, the flattening procedures 30 then flatten the data into a boolean representation. Flattening converts the categorical attributes into boolean attributes by using a boolean representation of length n, where n is the total number of different possible attributes of a data entry. The $n^{th}$ position in the boolean representation is '1' if the corresponding attribute is present in the raw data entry, and the no position representation is '0' if the corresponding attribute is absent from the raw data entry. The resultant data is said the be n-dimensional. The raw data in FIG. 3 is depicted in flattened form in FIG. 4.

One aspect of the invention uses large itemsets. This aspect employs steps 108 and 110. Step 108 identifies the use of large itemsets. Step 110 uses the flattened data employing the large itemset procedures 34 to determine which attributes are large itemsets. Let $l=I_1, I_2, \ldots, I_n$ be a set of binary attributes. Let T be the training set consisting of patterns. Each pattern t is a subset of l. A pattern t supports an itemset X if $X \subset t$. Itemsets of cardinality k are referred to as k-itemsets. The support of an itemset is a measure of statistical significance and is defined to be the fraction of patterns that contain the itemset. Large itemsets are itemsets that have support greater than a given threshold. Such a threshold is typically 3–10%, and may be determined based on the percentage that yields the most accurate decision tree. However, it should be appreciated that the threshold may be lower than 3% or higher than 10%.

Several known algorithms may be used to derive large itemsets. One such algorithm which may be used is the Apriori algorithm, as presented in Agrawal and Srikant, *Fast Algorithms for Mining Association Rules*, Proc. of the 20th International Conference on Very Large Databases, Santiago, Chile, 1994. The decision tree, as detailed below, is then generated also using large itemsets as attributes on which to base the splitting criterion during classification. If the support is chosen to be high enough, the number of large itemsets may be substantially smaller than the large number of initial attributes. In addition to increasing the accuracy of the decision tree, if the large itemsets are appropriate attributes on which to base the splittin criterion, the total time required to build the decision tree mey be substantially less than the time required to build a decision tree based on all of the initial attributes. Also, the resulting decision tree may be substantially smaller than a decision tree based on the initial attributes.

Another aspect of the invention uses clustering. This aspect employs steps 111 and 112. Step 111 identifies the use of clustering. Step 112 uses the flattened data employing the clustering procedures 35 to add clustering attributes to each data entry. Clustering is performed by first grouping the set of possible attributes into clusters. Next, each entry is assigned one or more weights pertaining to the entry's degree of inclusion in each cluster. These weights are added to the entry as additional attributes on which classification may be based.

For example, in a grocery store there might be 10,000 items which a consumer could buy. However, a typical consumer only purchases about thirty items at one time. Each of the 10,000 items which the consumer could have bought belongs to a cluster, such as meats, dairy, vegetable, bread, etc. Each of the about thirty items which the consumer did buy belongs to one of the predetermined clusters. The consumer is then assigned a weight for each cluster, based on the number of items bought which belong to a cluster versus the total number of items bought. The weights represent the degree to which the consumer belongs to each cluster.

Clustering is well known in the art. One clustering method which may be used is association rule hypergraph clustering, which is described in detail in Han, Karypis, Kumar, and Mobasher, *Clustering Based on Association Rule Hypergraplhs*, SIGMOD '97 Workshop on Research Issues on Data Mining and Knowledge Discovery, 1997.

Using the flattened data and any combination of large itemsets and clusters, including the combination of neither large itemsets nor clusters, in step 113 the classification procedures 32 build a model on which future classification is based. Decision trees, which are known in the art, are one form of such a model that may be created.

Figures 5, 6:
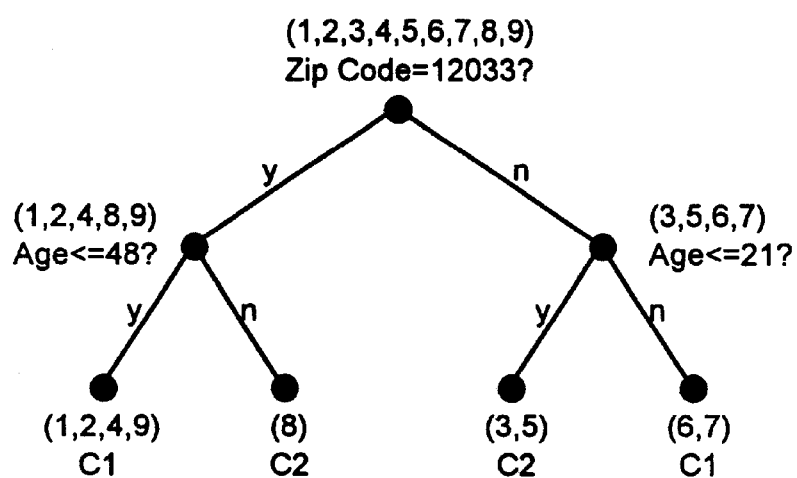
FIG. 5 depicts a second sample set of raw data, with the resultant class of each entry.
FIG. 6 depicts a decision tree based on the raw data of FIG. 5.

The creation of a decision tree includes two phases: the construction phase and the pruning phase. The construction phase requires that the training set be recursively partitioned into two or more subpartitions until a stopping criterion is met, e.g. each subpartition dominantly (or entirely) includes examples of one class. Thus, creation involves applying a splitting criterion to every internal node of the tree. An internal node is defined as any node that has at least one child node. These splitting criterion are determined by applying a predetermined splitting function. The splitting criterion at each internal node of the tree is based on one of the attributes in the set of possible attributes of the entries, including large itemset and cluster attributes, if used. The tree is created with a decreasing entropy as the nodes get farther away from the root node of the tree. The decision tree is the resulting hierarchical tree structure that is generated with the root representing the entire dataset. FIG. 6 depicts a decision tree created based on the sample data depicted in FIG. 5. In FIG. 6, the dataset evaluated at each node is in parentheses, with the splitting criterion below. It should be noted that a decision tree is not always symmetrical.

The creation and pruning of decision trees is known in the art, and examples of decision tree creation and pruning algorithms may be found in Mehta, Agrawal, and Rissanen, *SLIQ: A Fast Scalable Classifier for Data Mining*, Proc. of the Fifth International Conference on Extending Database Technology, Avignon, France; 1996.

In another embodiment of the invention, after the data has been flattened, a class determination for an entry e is made using a nearest neighbor technique. This is done by finding the m nearest neighbors of e, and then assigning the class of e based on the class assignments of the m nearest neighbors. The Euclidean distance between two data entries is used to find the nearest m neighbors, as represented by equation 1.

$$\left[\sum_{i=1}^{n}(x_i-y_i)^2\right]^{1/2} \quad (1)$$

Determination of nearest neighbors is known in the art. There are two main parameters: the value of m, generally between 3 and 5 inclusive, and the choice of which class to be assigned based on the class memberships of the m neighbors. There are three possible scenarios that may occur: all m neighbors belong to the same class, one class has a majority, or there is a tie. In the first case, the assigned class is the class of the m neighbors. In the second case, the assigned class is the class of the majority of the neighbors. In the third case, the tie can be broken arbitrarily. In another embodiment, in the second and third cases, all classes of the nearest neighbors are reported, and an appropriate choice can be made by an end user based on additional factors. In another aspect of the invention, more than one class may be assigned to the entry e.

In one aspect of the invention, the nearest neighbor attributes are weighted as will now be described. In the second and third cases above, the simple majority and arbitrary rules are modified to provide for weighted votes based on the inverse frequency of different classes present in the training set. That is, each vote is weighted inversely to the class' percentage representation in the training set. In order to avoid weighing an attribute too heavily, each dimension is generally normalized using the standard of deviation along that dimension.

EXAMPLE

Flattening

The inventive apparatus and method were constructed and performed, with respect to flattening, on data derived from the in-patient stay records at a Hospital. The dataset consisted of two delivery related DRGs: delivery with complications and delivery without complications. As shown below, the raw data training set classification error rate was 11.6%. The raw data test set classification error rate was 14.9%. The flattened data training set classification error rate was 0.8%, and the flattened data test set classification error rate was 1.4%. Thus, flattening the data has a significant impact on the overall accuracy rate.

| Flattening Classification | Original Format | | Flattened Format | |
|---|---|---|---|---|
| Error (%) | Training | Test | Training | Test |
| Delivery | 11.6 | 14.9 | 0.8 | 1.4 |

Having disclosed exemplary embodiments and the best mode, modifications and variations may be made to the disclosed embodiments while remaining within the scope of the present invention as defined by the following claims.

What is claimed is:

1. A method of classifying high dimensional data, the method comprising the steps of:
   (a) storing a raw data training set in a memory, said raw data including a multiplicity of entries each having a plurality of attributes;
   (b) flattening said raw data training set by converting each raw data entry into a respective binary string;
   (c) classifying a specific flattened data entry not in the training set based on said flattened training set by building a decision tree based on the attributes of the training set entries.

2. The method of claim 1, wherein classification step (c) is further performed by:
   (i) adding attributes to each flattened data entry, wherein each added attribute represents the flattened data entry weight; and
   (ii) building the decision structure based at least in part on the weight attributes.

3. A method of classifying high dimensional data, the method comprising the steps of:
   (a) storing a raw data training set in a memory, said raw data including a multiplicity of entries each having a plurality of attributes;
   (b) flattening said raw data training set by converting each raw data entry into a respective binary string;
   (c) classifying a specific flattened data entry not in the training set based on said flattened training set by:
      (i) identifying large itemsets with support above a predetermined threshold;
      (ii) building a decision tree based at least in part on said large itemsets.

4. A method of classifying high dimensional data, the method comprising the steps of:
   (a) storing a raw data training set in a memory, said raw data including a multiplicity of entries each having a plurality of attributes;
   (b) flattening said raw data training set by converting each raw data entry into a respective binary string;
   (c) classifying a specific flattened data entry not in the training set based on said flattened training set by:
      (i) determining m nearest neighbors of a specific entry to be classified, where m is a predetermined value;
      (ii) choosing a classification for said specific entry based on the classification of the m nearest neighbors.

5. The method of claim 4, wherein the classification for said specific entry is determined by:
   when all m nearest neighbors belong to a single class, said single class is assigned to the specific entry;
   when a majority of the m nearest neighbors belong to a single class, said single class is assigned to the specific entry;
   when there exists no class majority among the m nearest neighbors, a class for the specific entry is chosen arbitrarily from a set of classes with the highest occurrence among the m nearest neighbors.

6. A method of classifying high dimensional data, the method comprising the steps of:
   (a) storing a raw data training set in a memory, said raw data including a multiplicity of entries each having a plurality of attributes;
   (b) flattening said raw data training set by converting each raw data entry into a respective binary string;
   (c) classifying a specific flattened data entry not in the training set based on said flattened training set by:
      (i) determining m nearest neighbors of a specific entry to be classified, where m is a predetermined value;

(ii) choosing a classification for said specific entry based on the classification of the m nearest neighbors, wherein the classification for said specific entry is determined by:

when all m nearest neighbors belong to a single class, said single class is assigned to the specific entry;

when a majority of the m nearest neighbors belong to a single class, said single class is assigned to the specific entry;

when there exists no class majority among the m nearest neighbors, at least all classes with the highest occurrence among the m nearest neighbor are reported to a user.

7. A method of classifying high dimensional data, the method comprising the steps of:

(a) storing a raw data training set in a memory, said raw data including a multiplicity of entries each having a plurality of attributes;

(b) flattening said raw data training set by converting each raw data entry into a respective binary string;

(c) classifying a specific flattened data entry not in the training set based on said flattened training set by:

(i) determining m nearest neighbors of a specific entry to be classified, where m is a predetermined value;

(ii) choosing a classification for said specific entry based on the classification of the m nearest neighbors, wherein the classification for said specific entry is determined by:

when all m nearest neighbors belong to a single class, assigning the single class to the specific entry;

when the m nearest neighbors belong to at least two classes, weighting by using an inverse frequency of the at least two classes in the training set, generating weighted votes, and assigning the class having the greatest weighted votes to the specific entry.

8. A computer system for classifying high-dimensional data comprising:

a memory;

data, including a training set comprised of a multiplicity of entries each having a plurality of attributes, and a specific data entry not in the training set;

communications procedures to receive the data as input;

control procedures to flatten the training set and the specific data entry, and to classify the flattened specific data entry based on the flattened training set; and a processor coupled to the memory and configured to execute said control and communications procedures, wherein the processor is further configured to classify the specific data entry using a decision tree based on the attributes.

9. The apparatus of claim 8, wherein the attributes include large itemsets.

10. A computer system for classifying high-dimensional data comprising:

a memory;

data, including a training set comprised of a, multiplicity of entries each having a plurality of attributes, and a specific data entry not in the training set;

communications procedures to receive the data as input;

control procedures to flatten the training set and the specific data entry, and to classify the flattened specific data entry based on the flattened training set; and a processor coupled to the memory and configured to execute said control and communications procedures, wherein the processor is further configured to classify the specific data entry using a nearest neighbor class model.

11. The apparatus of claim 10, wherein the processor is further configured to determine the classification of the specific entry by:

when all m nearest neighbors belong to a single class, said single class is assigned to the specific entry;

when a majority of the m nearest neighbors belong to a single class, said single class is assigned to the specific entry;

when there exists no class majority among the m nearest neighbors, a class for the specific entry is chosen arbitrarily from a set of classes with the highest occurrence among the in nearest neighbors.

12. A computer system for classifying high-dimensional data comprising:

a memory;

data, including a training set comprised of a multiplicity of entries each having a plurality of attributes, and a specific data entry not in the training set;

communications procedures to receive the data as input;

control procedures to flatten the training set and the specific data entry, and to classify the flattened specific data entry based on the flattened training set; and a processor coupled to the memory and configured to execute said control and communications procedures, wherein the processor is further configured to classify the specific data entry using a nearest neighbor class model and to determine the classification of the specific entry by:

when all m nearest neighbors belong to a single class, said single class is assigned to the specific entry;

when a majority of the m nearest neighbors belong to a single class, said single class is assigned to the specific entry;

when there exists no class majority among the m nearest neighbors, at least all classes with the highest occurrence among the m nearest neighbors are reported to a user.

13. A computer system for classifying high-dimensional data comprising:

a memory;

data, including a training set comprised of a multiplicity of entries each having a plurality of attributes, and a specific data entry not in the training set;

communications procedures to receive the data as input;

control procedures to flatten the training set and the specific data entry, and to classify the flattened specific data entry based on the flattened training set; and a processor coupled to the memory and configured to execute said control and communications procedures, wherein the processor is further configured to classify the specific data entry using a nearest neighbor class model and to determine the classification of the specific entry by:

when all m nearest neighbors belong to a single class, assigning the single class to the specific entry;

when the m nearest neighbors belong to at least two classes, weighting by using an inverse frequency of the at least two classes in the training set, generating weighted votes, and assigning the class having the greatest weighted votes to the specific entry.

14. A computer program product for use in conjunction with a computer system, the computer program product comprising a computer readable storage medium and a computer program mechanism embedded therein, the computer program mechanism, comprising: a program module that directs the computer system including a processor to function in a specified manner for classifying high-dimensional data, the program module including instructions for:
- (a) storing a raw data training set in a memory, said raw data including a multiplicity of entries each having a plurality of attributes;
- (b) flattening said raw data training set by converting each raw data entry into a respective binary string; and
- (c) classifying a specific flattened data entry not in the training set based on said flattened training set by:
  - (i) identifying large item sets with support above a predetermined threshold; and
  - (ii) building a decision tree based at least in part on said large item sets.

15. A computer program product for use in conjunction with a computer system, the computer program product comprising a computer readable storage medium and a computer program mechanism embedded therein, the computer program mechanism, comprising: a program module that directs the computer system including a processor to function in a specified manner for classifying high-dimensional data, the program module including instructions for:
- (a) storing a raw data training set in a memory, said raw data including a multiplicity of entries each having a plurality of attributes;
- (b) flattening said raw data training set by converting each raw data entry into a respective binary string;
- (c) classifying a specific flattened data entry not in the training set based on said flattened training set by:
  - (i) determining m nearest neighbors of a specific entry to be classified, where m is a predetermined value;
  - (ii) choosing a classification for said specific entry based on the classification of the m nearest neighbors.

* * * * *